United States Patent Office 2,731,477
Patented Jan. 17, 1956

2,731,477

PROCESS FOR THE MANUFACTURE OF ANTHRAQUINONE DYESTUFFS SUITABLE FOR DYEING CELLULOSE ACETATE ARTIFICIAL SILK

Paul Grossmann, Binningen, Switzerland, assignor to Ciba Limited, Basel, Switzerland, a Swiss firm No Drawing. Application May 22, 1953,
Serial No. 356,907

Claims priority, application Switzerland May 30, 1952

14 Claims. (Cl. 260—378)

The present invention is based on the observation that valuable dyestuffs suitable for dyeing cellulose acetate artificial silk can be made in an especially simple and advantageous manner by causing an aliphatic amine and ammonia to act simultaneously upon 1:4-dihydroxyanthraquinone in the presence of a leuco-compound of an anthraquinone which contains as a substituent in each of the 1- and 4-positions a hydroxyl or amino group, and then, if desired oxidizing the leuco compound in the resulting mixture.

As leuco compounds of the aforesaid kind there may be used, for example, those which contain in each of the 1- and 4-positions a hydroxyl or amino group, especially a primary amino group or an alkyl amino group. Thus, for example, the leuco compound of 1:4-dihydroxyanthraquinone, of 1:4-diaminoanthraquinone, of 1-hydroxy-4-aminoanthraquinone, of 1:4-dialkylamino, 1-amino-4-alkylamino- or 1-hydroxy-4-alkylamino-anthraquinones may be used.

Among the aliphatic amines good results are obtained more especially with amines of low molecular weight, for example, those containing 1–4 carbon atoms. These amines may also if desired, contain hydroxyl groups. There may be used more especially primary amines of which the carbon chain may be straight or branched. As examples there may be mentioned methylamine, ethylamine, n-propylamine, isopropylamine, n-butylamine, secondary butylamine, $\beta$-hydroxyethylamine, $\gamma$-hydroxyproplyamine and $\beta$:$\gamma$-dihydroxypropylamine.

The relative proportions of 1:4-dihydroxyanthraquinone to the leuco compound of the aforesaid kind may vary within wide limits in the present process. Very good results are produced, for example, by using 4 parts of 1:4-dihydroxyanthraquinone and about 1 part of the leuco compound. It will be understood that a larger quantity of the leuco compound may be used, for example, about equal parts of the leuco compound and 1:4-dihydroxyanthraquinone. However, in most cases this is not necessary and leads to no advantage. A high proportion of the leuco compound generally leads merely to a high consumption of oxidizing agent in the subsequent oxidation.

In the present process there may be used with advantage for every one molecular proportion of the mixture of 1:4-dihydroxyanthraquinone and leuco compound about 1 molecular proportion, advantageously 2–3 molecular proportions, of ammonia.

Instead of preparing the leuco compound of 1:4-dihydroxyanthraquinone in a separate operation, a part of the 1:4-dihydroxyanthraquinone, which is used in the process, may be reduced in the reaction mixture to the leuco compound, and after or during the reduction process or simultaneously therewith the reaction with ammonia and, if desired, with the alkylamine may commence. As reducing agents there come into consideration, for example, zinc dust or sodium hydrosulfite.

The reactions of the present process are advantageously conducted in an aqueous medium and preferably in the presence of a water-soluble organic solvent such, for example, as methanol or ethanol. They may, however, be carried out in organic solvents, for example, in a water-soluble organic solvent in the absence of water or in the presence of a small amount of water or in a water-insoluble organic solvent such as toluene, xylene, in the absence of water. A moderately raised reaction temperature, for example, a temperature of 60–120° C., generally ensures a smooth course of the reactions of the present process.

The reaction with ammonia and an aliphatic amine is advantageously carried out in a closed vessel under pressure. It is supposed that in the reaction the hydroxyl groups in the leuco compound are first exchanged for amino and alkylamino groups or amino groups are exchanged for alkylamino groups. It is probable that the leuco compounds substituted in the 1- and/or 4-position by amino or alkylamino groups are then able to reduce the 1:4-dihydroxyanthraquinone to the leuco compound, the aforesaid leuco compounds themselves being oxidized to the corresponding anthraquinones. The two reactions probably proceed further in this manner side by side until practically the whole of the 1:4-dihydroxyanthraquinone has been consumed. There is obtained finally a mixture of 1:4-diaminoanthraquinone, 1:4-dialkylaminoanthraquinone and 1-amino-4-alkylaminoanthraquinone, and also the leuco compounds of these substances.

Provided that it is not desired to retain leuco compounds or tolerate their presence in the resulting reaction mixture, or if the leuco compounds do not undergo oxidation to a sufficient extent during their further treatment, the leuco compounds, after the reaction with ammonia and the aliphatic amine, are oxidized in known manner, and the oxidation is advantageously carried out without any intermediate isolation and with the addition of an organic solvent, if the reaction mixture does not already contain such a solvent. For such oxidations there may be used the usual oxidizing agents such, for example, as alkali chlorates or air with the addition of copper acetate and/or piperidine. Especially advantageous is 3-nitrobenzene-1-sulfonic acid, which is advantageously used in the form of an alkali salt.

The products of the present process are valuable, and in part new, dyestuffs which can be used for dyeing various materials. However, they are especially suitable for dyeing cellulose esters such as cellulose acetate artificial silk or cellulose acetate foils, and also synthetic fibers, for example, those of superpolyamides or superpolyurethanes. The dyestuffs when used for these purposes are in general distinguished by their especially good capacity for being absorbed. If desired, the products of the present invention may also be used as intermediate products.

The following examples illustrate the invention, the parts and percentages being by weight:

Example 1

80 parts of 1:4-dihydroxyanthraquinone and 25 parts of leuco-1:4-dihydroxyanthraquinone are heated in 400 parts of methanol with 30.5 parts of $\beta$-hydroxyethylamine and 90 parts of an aqueous solution of ammonia of 25 per cent. strength in an autoclave fitted with stirring means first for 5 hours at 60° C. and then for 12 hours at 100° C. There is then added a solution of 10.5 parts of sodium 3-nitrobenzene-1-sulfonate in 50 parts of water, and the whole is maintained at 100° C. for 4 hours. After cooling, the mixture is filtered and the filter residue is washed with water. The dyestuff so obtained dyes cellulose acetate artificial silk by the usual dispersion process very powerful blue-violet tints.

Instead of $\beta$-hydroxyethylamine there may be used $\gamma$-hydroxypropylamine or $\beta$:$\gamma$-dihydroxypropylamine.

Example 2

80 parts of 1:4-dihydroxyanthraquinone and 25 parts of leuco-1:4-diaminoanthraquinone are heated in 400 parts of methanol with 36 parts of isopropylamine and 112.5 parts of an aqueous solution of ammonia of 25 per cent. strength in an autoclave fitted with stirring means for 12 hours at 100° C. The product is then oxidized, and the dyestuff is isolated as described in Example 1. The dyestuff so obtained dyes cellulose acetate silk somewhat more reddish tints than the dyestuff of the first paragraph of Example 1.

Example 3

80 parts of 1:4-dihydroxyanthraquinone and 25 parts of leuco-1:4-dihydroxyanthraquinone are heated in 400 parts of methanol with 36.2 parts of isopropylamine and 112.5 parts of an aqueous solution of ammonia of 25 per cent. strength in an autoclave fitted with stirring means first for 5 hours at 60° C. and then for 12 hours at 100° C. The product is then oxidized and the dyestuff is isolated as described in Example 1. The dyestuff so obtained dyes cellulose acetate silk somewhat more reddish tints than the dyestuff obtainable as described in the first paragraph of Example 1.

Example 4

80 parts of 1:4-dihydroxyanthraquinone and 25 parts of leuco-1:4-dihydroxyanthraquinone are heated in 400 parts of methanol with 16 parts of methylamine and 112.2 parts of an aqueous solution of ammonia of 25 per cent. strength in an autoclave for 5 hours at 60° C. and then for 12 hours at 100° C. The product is then oxidized and the dyestuff is isolated as described in Example 1. It dyes cellulose acetate artificial silk considerably more bluish violet tints than the dyestuff obtainable as described in the first paragraph of Example 1.

Similar dyestuffs are obtained by using, instead of methylamine, ethylamine, n-propylamine, or n-butylamine.

Example 5

The procedure is the same as that described in the first paragraph of Example 4, except that instead of 16 parts of methylamine only 10 parts are used. There is obtained a dyestuff which dyes cellulose acetate artificial silk in tints similar to those of the dyestuff obtained as described in the first paragraph of Example 1.

Similar dyestuffs are obtained by using, instead of 10 parts of methylamine, 15 parts of ethylamine, 20 parts of n-propylamine or 25 parts of n-butylamine.

Example 6

160 parts of 1:4-dihydroxyanthraquinone and 50 parts of leuco-1:4-dihydroxyanthraquinone are heated in 800 parts of methanol with 75 parts of secondary butylamine in 225 parts of a methyl alcoholic solution of ammonia of 25 per cent. strength in an autoclave for 5 hours at 60° C. and then for 12 hours at 100° C. The product is oxidized and the dyestuff is isolated in a manner analogous to that described in Example 1. The dyestuff dyes cellulose acetate artificial silk tints very similar to those of the dyestuff of Example 3.

Example 7

The procedure is the same as that described in Example 3, except that, instead of 25 parts of leuco-1:4-dihydroxyanthraquinone, there are used 27.5 parts of leuco-1-hydroxy-4-isopropylaminoanthraquinone, and, instead of 36.2 parts of isopropylamine, 27 parts thereof. The resulting dyestuff dyes cellulose acetate artificial silk somewhat bluer tints than those of the dyestuff of Example 3.

Example 8

The procedure is the same as that in Example 7 except that, instead of 27.5 parts of leuco-1-hydroxy-4-isopropyl-aminoanthraquinone, there are used 27.5 parts of leuco-1-amino-4-isopropylanthraquinone. The dyestuff so obtained dyes cellulose acetate artificial silk somewhat redder tints than those of the dyestuff of Example 3.

Example 9

The procedure is the same as that described in Example 7, except that instead of 27.5 parts of leuco-1-hydroxy-4-isopropylaminoanthraquinone, there are used 27.5 parts of leuco - 1:4 - di - ($\beta$ - hydroxyethylamino) - anthraquinone. The resulting dyestuff dyes cellulose acetate artificial silk tints similar to those of the dyestuff of Example 3.

Example 10

The procedure is the same as that described in Example 3, except that 3.5 parts of sodium chlorate are used for oxidation, instead of 10.5 parts of sodium 3-nitrobenzene-1-sulfonate. The resulting dyestuff dyes cellulose acetate artificial silk tints which are very similar to those of the dyestuff of Example 3.

Example 11

160 parts of 1:4-dihydroxyanthraquinone and 50 parts of leuco-1:4-dihydroxyanthraquinone are heated in 860 parts of a solution of 8 per cent. strength of ammonia gas in isobutyl alcohol with 72 parts of isopropylamine in an autoclave for 12 hours at 100° C. 10 parts of nitrobenzene are added and the whole is heated for a further 4 hours at 100° C. The dyestuff is isolated by evaporation. The dyeing on cellulose acetate artificial silk is very similar to that of the dyestuff of Example 3.

Example 12

The procedure is the same as that described in Example 11, except that the oxidation is carried out by introducing air for 6 hours at 95–100° C. with the addition of 1 part of copper acetate and 3 parts of piperidine. The dyestuff is isolated in the manner described in Example 11. The dyeing on cellulose acetate artificial silk is very similar to that of the dyestuff of Example 11.

Example 13

80 parts of 1:4-dihydroxyanthraquinone and 25 parts of leuco-1:4-dihydroxyanthraquinone are mixed in an autoclave in 500 parts of xylene with 36 parts of isopropylamine. 29 parts of ammonia gas are then introduced under pressure into the closed autoclave, and the whole is heated for 12 hours at 100–110° C. 5 parts of nitrobenzene are added and the whole is heated for a further 4 hours at 100° C. The dyestuff is isolated by evaporation or distillation with steam. It dyes cellulose acetate artificial silk redder tints than those of the dyestuff of Example 11.

Example 14

105 parts of 1:4-dihydroxyanthraquinone are heated in 400 parts of methanol with 16 parts of methylamine, 112.5 parts of an aqueous solution of ammonia of 25 per cent. strength and 23 parts of sodium hydrosulfite of 85 per cent. strength in an autoclave for 12 hours at 100° C. The product is oxidized and the dyestuff is isolated as described in Example 1. It dyes cellulose acetate artificial silk tints similar to those of the dyestuff of Example 4.

Example 15

The procedure is the same as in Example 14, except that 8 parts of zinc dust of 90 per cent. strength are used instead of 23 parts of sodium hydrosulfite. A very similar dyestuff is obtained.

Example 16

The procedure is the same as that in Example 15, except that 20 parts of sodium bicarbonate are also added, whereby there is obtained a somewhat more strongly dyeing dyestuff than that of Example 15.

Example 17

80 parts of 1:4-dihydroxyanthraquinone and 25 parts of leuco-1:4-dihydroxyanthraquinone are heated in 250 parts of methanol with 36 parts of isopropylamine and 215 parts of a methyl alcoholic solution of ammonia of 17.7 per cent. strength in an autoclave fitted with stirring means for 12 hours at 100° C. 10.5 parts of sodium 3-nitrobenzene-1-sulfonate are added and the mixture is heated for 4 hours at 100° C. The mixture is filtered in the cold and the filter residue is washed with a small amount of methanol and water. The resulting dyestuff dyes cellulose acetate artificial silk very strong and fast blue-violet tints.

*Example 18*

160 parts of 1:4-dihydroxyanthraquinone and 50 parts of leuco-1:4-dihydroxyanthraquinone are heated in 800 parts of water with 270 parts of an aqueous solution of ammonia of 25 per cent. strength and 61 parts of β-hydroxyethylamine in an autoclave fitted wtih stirring means for 12 hours at 100° C. After cooling the mixture it is filtered, and the filter residue is washed with water and dried. After suitably pasting the dyestuff it dyes cellulose acetate artificial silk strong blue-violet tints.

The reaction proceeds in a similar manner when 32 parts of methylamine are used instead of 61 parts of β-hydroxyethylamine.

*Example 19*

160 parts of 1:4-dihydroxyanthraquinone and 50 parts of leuco-1:4-dihydroxyanthraquinone are heated in 800 parts of water with 270 parts of an aqueous solution of ammonia of 25 per cent. strength and 60 parts of isopropylamine in an autoclave fitted with stirring means for 12 hours at 100° C. After cooling the mixture it is filtered and the filter residue is washed with water. The product so obtained is then heated in 750 parts of methyl alcohol with 250 parts of ammonia and 20 parts of sodium 3-nitrobenzene-1-sulfonate for 4 hours at 100° C., the mixture is then filtered in the cold and the filter residue is washed with water. The dyestuff so obtained dyes cellulose acetate artificial silk strong and fast blue-violet tints.

*Example 20*

0.5 part of the dyestuff obtained as described in the first paragraph of Example 1 are pasted in the usual manner. To the resulting paste, having a strength of about 20 per cent., there are added about 105 parts of a soap solution heated at 60° C. prepared with soft water and containing 2 grams of soap per liter. The solution is thoroughly mixed and added to a dyebath containing 3000 parts of soft water, which contains 6 parts of soap. 100 parts of cellulose acetate artificial silk are then entered at 40° C., the temperature is slowly raised to 80° C., and dyeing is carried on for one hour at 80° C. The goods are then rinsed and finished in the usual manner. The cellulose acetate artificial silk is dyed a strong, fast blue-violet tint.

What is claimed is:

1. Process for the manufacture of dyestuffs suitable for dyeing cellulose acetate artificial silk which comprises causing an aliphatic amine and ammonia to react simultaneously upon 1:4-dihydroxyanthraquinone in the presence of a leuco-compound of an anthraquinone which contains as a substituent in each of the 1- and 4-positions a substituent selected from the group consisting of a hydroxyl and an amino group.

2. Process for the manufacture of dyestuffs suitable for dyeing cellulose acetate artificial silk which comprises causing an aliphatic amine and ammonia to react simultaneously upon 1:4-dihydroxyanthraquinone in the presence of a leuco-compound of an anthraquinone which contains as a substituent in each of the 1- and 4-positions a substituent selected from the group consisting of a hydroxyl and an amino group, and oxidizing the leuco-compound in the resulting mixture.

3. Process for the manufacture of dyestuffs suitable for dyeing cellulose acetate artificial silk which comprises causing about 1 molecular proportion of an aliphatic amine and more than 1 molecular proportion of ammonia to react simultaneously upon 1 molecular proportion of a mixture of anthraquinone compounds consisting of 1:4-dihydroxyanthraquinone and leuco-1:4-dihydroxyanthraquinone, and oxidizing the leuco-compound in the resulting mixture.

4. Process for the manufacture of dyestuffs suitable for dyeing cellulose acetate artificial silk which comprises causing about 1 molecular proportion of an aliphatic amine and more than 1 molecular proportion of ammonia to react simultaneously upon 1 molecular proportion of a mixture of anthraquinone compounds of which at least 50 per cent consists of 1:4-dihydroxyanthraquinone and the remainder consists of leuco-1:4-dihydroxyanthraquinone, and oxidizing the leuco-compound in the resulting mixture.

5. Process for the manufacture of dyestuffs suitable for dyeing cellulose acetate artificial silk which comprises causing about 1 molecular proportion of an aliphatic amine containing from 1 to 4 carbon atoms and more than 1 molecular proportion of ammonia to react simultaneously upon 1 molecular proportion of a mixture of anthraquinone compounds of which at least 50 per cent consists of 1:4-dihydroxyanthraquinone and the remainder consists of leuco-1:4-dihydroxyanthraquinone, and oxidizing the leuco-compound in the resulting mixture.

6. Process for the manufacture of dyestuffs suitable for dyeing cellulose acetate artificial silk which comprises causing about 1 molecular proportion of an aliphatic amine containing from 1 to 4 carbon atoms and more than 1 molecular proportion of ammonia to react in an aqueous medium and in the presence of a water-soluble organic solvent simultaneously upon 1 molecular proportion of a mixture of anthraquinone compounds of which at least 50 per cent consists of 1:4-dihydroxyanthraquinone and the remainder consists of leuco-1:4-dihydroxyanthraquinone, and oxidizing the leuco-compound in the resulting mixture.

7. Process for the manufacture of dyestuffs suitable for dyeing cellulose acetate artificial silk which comprises causing about 1 molecular proportion of an aliphatic amine containing from 1 to 4 carbon atoms and more than 1 molecular proportion of ammonia to react in an aqueous medium and in the presence of a water-soluble organic solvent at a temperature within the range of 60° C. to 120° C. and under pressure simultaneously upon 1 molecular proportion of a mixture of anthraquinone compounds of which at least 50 per cent consists of 1:4-dihydroxyanthraquinone and the remainder consists of leuco-1:4-dihydroxyanthraquinone, and oxidizing the leuco-compound in the resulting mixture.

8. Process for the manufacture of dyestuffs suitable for dyeing cellulose acetate artificial silk which comprises causing about 1 molecular proportion of an aliphatic amine containing from 1 to 4 carbon atoms and more than 1 molecular proportion of ammonia to react in an aqueous medium and in the presence of a water-soluble organic solvent at a temperature within the range of 60° C. to 120° C. and under pressure simultaneously upon 1 molecular proportion of a mixture of anthraquinone compounds of which at least 50 per cent consists of 1:4-dihydroxyanthraquinone and the remainder consists of leuco-1:4-dihydroxyanthraquinone, and oxidizing with an alkali salt of 3-nitrobenzene-1-sulfonic acid the leuco-compound in the resulting mixture.

9. Process for the manufacture of dyestuffs suitable for dyeing cellulose acetate artificial silk which comprises causing about 1 molecular proportion of an aliphatic amine containing from 1 to 4 carbon atoms and more than 1 molecular proportion of ammonia to react in an aqueous medium and in the presence of a water-soluble organic solvent at a temperature within the range of 60° C. to 120° C. and under pressure simultaneously upon 1 molecular proportion of a mixture of anthraquinone compounds of which at least 50 per cent consists of 1:4-dihydroxyanthraquinone and the remainder consists of leuco-1:4-dihydroxyanthraquinone the latter being produced in the reaction mixture itself from 1:4-dihydroxyanthraquinone by the addition of a reducing agent, and oxidizing the leuco-compound in the resulting mixture.

10. Process for the manufacture of dyestuffs suitable for dyeing cellulose acetate artificial silk which comprises causing about 1 molecular proportion of isopropylamine and more than 1 molecular proportion of ammonia to react in an aqueous medium and in the presence of methanol at a temperature within the range of 60° C. to 120° C. and under pressure simultaneously upon 1 molecular proportion of a mixture of anthraquinone compounds of which about 80 per cent consists of 1:4-dihydroxyanthraquinone and the remainder consists of leuco-1:4-dihydroxyanthraquinone, and oxidizing with sodium 3-nitrobenzene-1-sulfonate the leuco compound in the resulting mixture.

11. Process for the manufacture of dyestuffs suitable for dyeing cellulose acetate artificial silk which comprises causing about 1 molecular proportion of methylamine and more than 1 molecular proportion of ammonia to react in an aqueous medium and in the presence of methanol at a temperature within the range of 60° C. to 120° C. and under pressure simultaneously upon 1 molecular proportion of a mixture of anthraquinone compounds of which about 80 per cent consists of 1:4-dihydroxyanthraquinone and the remainder consists of leuco-1:4-dihydroxyanthraquinone, and oxidizing with sodium 3-nitrobenzene-1-sulfonate the leuco-compound in the resulting mixture.

12. Process for the manufacture of dyestuffs suitable for dyeing cellulose acetate artificial silk which comprises causing about 1 molecular proportion of secondary butylamine and more than 1 molecular proportion of ammonia to react in the presence of methanol at a temperature within the range of 60° C. to 120° C. and under pressure simultaneously upon 1 molecular proportion of a mixture of anthraquinone compounds of which about 80 per cent consists of 1:4-dihydroxyanthraquinone and the remainder consists of leuco-1:4-dihydroxyanthraquinone, and oxidizing with sodium-3-nitrobenzene-1-sulfonate the leuco compound in the resulting mixture.

13. Process for the manufacture of dyestuffs suitable for dyeing cellulose acetate artificial silk which comprises causing about 1 molecular proportion of isopropylamine and more than 1 molecular proportion of ammonia to react in an aqueous medium and in the presence of methanol at a temperature within the range of 60° C. to 120° C. and under pressure simultaneously upon 1 molecular proportion of a mixture of anthraquinone compounds of which about 80 per cent consists of 1:4-dihydroxyanthraquinone and the remainder consists of leuco-1:4-dihydroxyanthraquinone, and oxidizing with sodium chlorate the leuco compound in the resulting mixture.

14. Process for the manufacture of dyestuffs suitable for dyeing cellulose acetate artificial silk which comprises causing about 1 molecular proportion of methylamine and more than 1 molecular proportion of ammonia to react in an aqueous medium and in the presence of methanol at a temperature within the range of 60° C. to 120° C. and under pressure simultaneously upon 1 molecular proportion of a mixture of anthraquinone compounds of which at least 50 per cent consists of 1:4-dihydroxyanthraquinone and the remainder consists of leuco-1:4-dihydroxyanthraquinone the latter being produced in the reaction mixture itself from 1:4-dihydroxyanthraquinone by the addition of zinc dust and sodium bicarbonate, and oxidizing with sodium 3-nitrobenzene-1-sulfonate the leuco compound in the resulting mixture.

References Cited in the file of this patent

UNITED STATES PATENTS

| | | |
|---|---|---|
| 1,828,262 | Tatum | Oct. 20, 1931 |
| 2,050,660 | Koeberle et al. | Aug. 11, 1936 |
| 2,050,662 | Koeberle et al. | Aug. 11, 1936 |
| 2,112,258 | Wilder | Mar. 29, 1938 |
| 2,128,307 | Lord et al. | Aug. 30, 1938 |
| 2,152,191 | Herrett | Mar. 28, 1939 |
| 2,228,884 | Olpin et al. | Jan. 14, 1941 |